(12) United States Patent
Bennison (10) Patent No.: US 8,514,412 B2
(45) Date of Patent: Aug. 20, 2013

(54) PORTABLE GAUGE AND METHOD FOR MEASURING TAPE GAPS

(75) Inventor: Stephen John Bennison, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 172 days.

(21) Appl. No.: 13/118,410

(22) Filed: May 28, 2011

(65) Prior Publication Data

US 2012/0300221 A1 Nov. 29, 2012

(51) Int. Cl.
*G01B 11/02* (2006.01)
*G01B 11/00* (2006.01)

(52) U.S. Cl.
CPC ............... *G01B 11/02* (2013.01); *G01B 11/00* (2013.01)
USPC ........................................... 356/635; 356/626

(58) Field of Classification Search
CPC ............................... G01N 11/02; G01N 11/00
USPC .................................................. 356/625–640
See application file for complete search history.

(56) References Cited

U.S. PATENT DOCUMENTS

| | | | | |
|---|---|---|---|---|
| 4,666,303 A | * | 5/1987 | Pryor | 356/606 |
| 4,897,540 A | * | 1/1990 | Sakaguchi et al. | 250/223 R |
| 5,052,799 A | * | 10/1991 | Sasser et al. | 356/139.03 |
| 5,120,976 A | * | 6/1992 | Clayton et al. | 250/559.07 |
| 5,562,788 A | | 10/1996 | Kitson et al. | |
| 7,253,908 B2 | * | 8/2007 | Vaccaro et al. | 356/607 |
| 7,495,758 B2 | | 2/2009 | Walton | |
| 7,769,224 B2 | | 8/2010 | Engelbart et al. | |
| 8,050,486 B2 | | 11/2011 | Walton | |
| 2004/0168837 A1 | * | 9/2004 | Michaud et al. | 180/9.46 |
| 2006/0017937 A1 | * | 1/2006 | Vaccaro et al. | 356/607 |
| 2007/0271064 A1 | | 11/2007 | Walton | |
| 2007/0277919 A1 | | 12/2007 | Savol et al. | |
| 2008/0055591 A1 | * | 3/2008 | Walton | 356/237.1 |
| 2008/0186507 A1 | * | 8/2008 | Kildevaeld | 356/505 |
| 2008/0259325 A1 | * | 10/2008 | Engelbart et al. | 356/237.3 |

FOREIGN PATENT DOCUMENTS

WO WO2005103608 A1 11/2005

OTHER PUBLICATIONS

U.S. Appl. No. 11/383,681, filed May 16, 2006, Sarol.
EP search report dated Sep. 25, 2012 regarding application 12275068.0-2213, applicant The Boeing Company, 6 pages.

\* cited by examiner

*Primary Examiner* — Michael P Stafira

(74) *Attorney, Agent, or Firm* — Yee & Associates (57) ABSTRACT

Gaps between strips of composite tape forming a surface are measured by a gauge. The position of the edges of adjacent strips of the tape is sensed as the gauge is moved along the surface, and a gap between the adjacent strips is calculated based on the sensed position of the edges.

24 Claims, 7 Drawing Sheets

PORTABLE GAUGE AND METHOD FOR MEASURING TAPE GAPS

TECHNICAL FIELD

The present disclosure generally relates to the fabrication of composite structures formed from laying down composite tape strips, and deals more particularly with a portable gauge and method for measuring the gaps between the tape strips, especially after an area of a structure has been reworked.

BACKGROUND

Large composite structures may be fabricated using automated, composite tape layup machines (CTLMs). These relatively large and expensive machines use a computer controlled tape placement head to simultaneously lay down multiple strips of composite prepreg tape on a mandrel or other surface. The head places the tape strips in substantially parallel relationship and in edge-to-edge contact, however, small gaps may occur between edges of adjacent strips. If these gaps exceed an allowable tolerance, they may affect the quality and/or performance of the completed structure. When gaps exceed the allowed tolerance, it may be necessary to rework these areas of the structure in order to bring the structure to within manufacturing specifications. Following rework of the tape strips, the areas are re-inspected to assure that tape gaps have been brought to within specified tolerances.

Currently, the tape gap inspection process may be performed by a technician using a hand gauge to make each individual tape gap measurement. The technician is required to manually reposition the gauge to each measurement point along the length of a reworked tape. At each measurement point, the technician kneels and takes a visual gap reading. This hand measurement technique is labor intensive and may be impractical for use on large scale structures because of the number of measurements that may be necessary and the time required to complete the measurements. Also, the accuracy of the hand held measurements may be subject to the skill level of the technician.

Tape gaps may also be measured automatically a using non-contact inspection device integrated into the tape placement head of the CTML, however this solution may require that the CTML be taken off-line from production to perform the inspection process. The resulting machine downtime may reduce production throughput, and may be inefficient where only a single reworked tape strip requires inspection.

Accordingly, there is a need for a method and apparatus for measuring tape gaps that is accurate and efficient in carrying out multiple tape gap measurements over large areas of a structure, and which is not highly dependent upon operator skill.

SUMMARY

The disclosed embodiments provide a portable gauge and related method for rapidly performing multiple tape gap measurements useful in inspecting reworked sections of large scale composite structures. The embodiments may reduce labor costs and avoid interruptions in production flow. The portable gauge allows automated triggering, acquisition and analysis of tape gap measurements. The gauge employs an active steering system that automatically steers along tape strip edges, thereby allowing the gauge to be moved rapidly while continuous gap measurements are performed.

According to one disclosed embodiment, a tape gap inspection gauge is provided. The gauge comprises a measurement system for measuring a gap between adjacent strips of the tape. The measurement system includes at least one non-contact sensor for sensing the edge of at least one of the tape strips. The gage further comprises a movement system for moving the measurement system along the surface of the tape strips. The gauge further includes a frame on which the measurement system is mounted. The movement system includes wheels supporting the frame for rolling movement along the tape strip surface, and a steering system on the frame for steering at least one steerable wheel. The measurement system may include two laser line projectors for projecting laser lines across the edges of two adjacent tape strips, and two non-contact sensors for detecting the edges of the adjacent tape strips. The steering system may include a servo motor and linkage coupled between the servo motor and the steerable wheel.

According to another disclosed embodiment, a portable gauge is provided for inspecting the surface of a composite structure formed from strips of composite tape. The gauge comprises a measurement system for measuring a feature of the strips of the tape, and a movement system adapted to be placed on the surface of the structure for moving the measurement system along the surface. The feature may comprise a gap between adjacent tape strips. The measurement system may comprise sensors for sensing the edges of adjacent ones of the tape strips, and a computer for calculating the gap based on the location of the sensed edges. The measurement system may include a pair of laser line projectors for projecting laser lines across the edges of the adjacent tape strips, and the sensors are positioned to sense 2-D reflections of the projected laser lines from the surface of the structure.

According to still another embodiment, a method is provided of measuring a gap between strips of composite tape forming a composite structure. A gauge is placed on the surface of the structure, and is moved along the surface. A measurement system on the gauge is used to measure gaps between the tape strips as the gauge moves along the surface.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
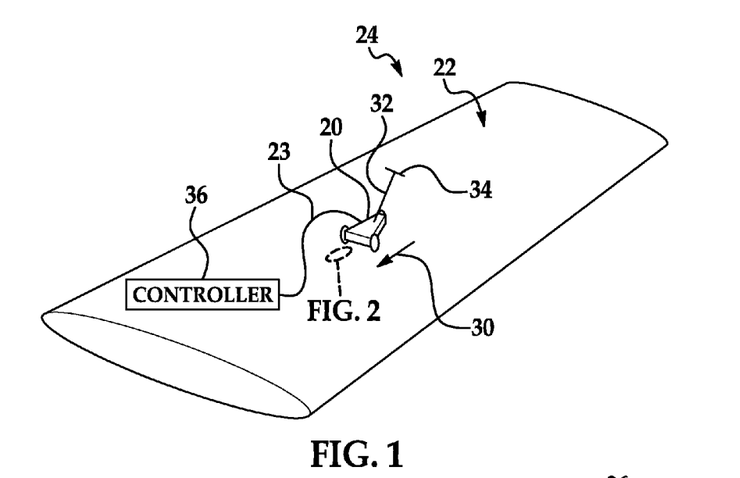
FIG. 1 is an illustration of a perspective view of composite structure being inspected by a portable gauge according to the disclosed embodiments.
Figure 2:
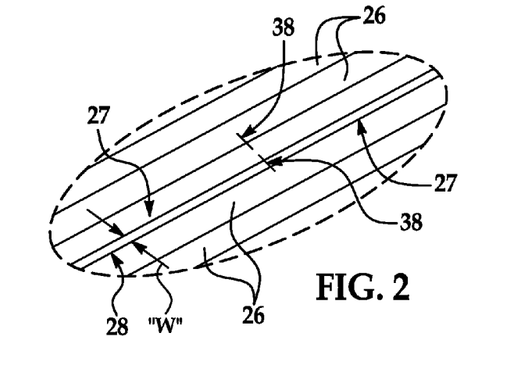
FIG. 2 is an illustration of an enlarged view of the area designated as "FIG. 2" in FIG. 1.

Referring first to FIGS. 1 and 2, a composite structure 24 is fabricated by laying up multiple, substantially parallel strips of composite tape 26, sometimes also referred to herein as "tape strips", forming a composite surface 22. In the illustrated example, the composite structure 24 comprises an aircraft wing, and the surface 22 comprises the outer skin of the wing, however the disclosed embodiments may be used in connection with other composite structures that are formed from strips of composite prepreg tape 26. The tape strips 26 may comprise groups of composite tows or materials other than composites.

As best seen in FIG. 2 the parallel tape strips 26 are laid down in substantially edge-to-edge contact with each other. In one or more areas of the composite structure 24, gaps 28 may be present between adjacent ones of the tape strips 26. In the event that the width "W" of a gap 28 exceeds a preselected tolerance, it may be necessary to rework the tape strips 26. For example, one or more of the tape strips 26 may be lifted, and repositioned in order to reduce the size of a gap 28. Following this rework process, the surface 22 is re-inspected to determine whether the gaps 28, if present, are within the desired range of tolerance.

In accordance with the disclosed embodiments, a portable gauge 20 may be employed to perform the gap inspection process, and particularly to automatically measure and record the width "W" of the gaps 28 in the areas where the surface 22 has been reworked. The inspection process may be carried out by a technician who moves the gauge 20 along the tape strip surface 22 in a direction 30 parallel to the tape strips 26 in each of the reworked areas. The gauge 20 may include an arm and/or handle 34 that allows the technician to push or pull the gauge 20 along the surface 22 continuously while the gauge 20 steers itself using an edge 27 of one of the tape strips 26 as a guide. The gauge 20 performs successive rolling gap measurements at predetermined intervals using a measurement system that projects laser lines 38 onto the surface 22 which traverse across the edges 27 of adjacent tape strips 26. The impinging laser lines 38 form a localized 2-D profile that is reflected, sensed and used by a controller 36 to calculate gap measurements. The controller 36 may be coupled to the gauge 20 either by wiring 23 or wirelessly. The controller 36 may be stationary or may be carried by the technician as the continuous gap measurements are being automatically carried out. In the case of a large scale composite structure 24, it may be possible to carry out tape gap measurements using the disclosed portable gap gauge 20 in one area of the structure 24 while composite tape strips 26 are being laid in another area of the structure 24.

Figure 3:
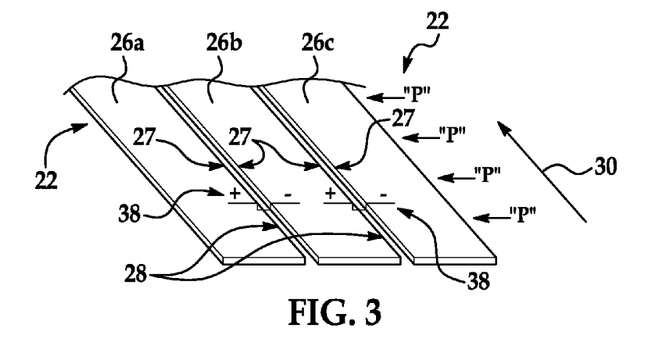
FIG. 3 is an illustration of a perspective view of three adjacent strips of tape showing the 2-D profile of laser lines projected across adjacent tape edges.

Referring to FIG. 3, the laser lines 38 projected onto the tape surface 22 extend traversely across and down into gaps 28 on both sides of a particular tape strip 26b, and are reflected as 2-D surface profiles representing the gaps 28. In the illustrated example, a gap 28 is present between adjacent tape strips 26a, 26b as well as between adjacent tape strips 26b, 26c. The 2-D surface profiles are sensed and sent to the controller 36 which computes the width "W" of gap 28 at successive positions "P" as the gauge 20 moves continuously in the direction 30, corresponding to the direction that the tape 26 has been laid down.

Figure 4:
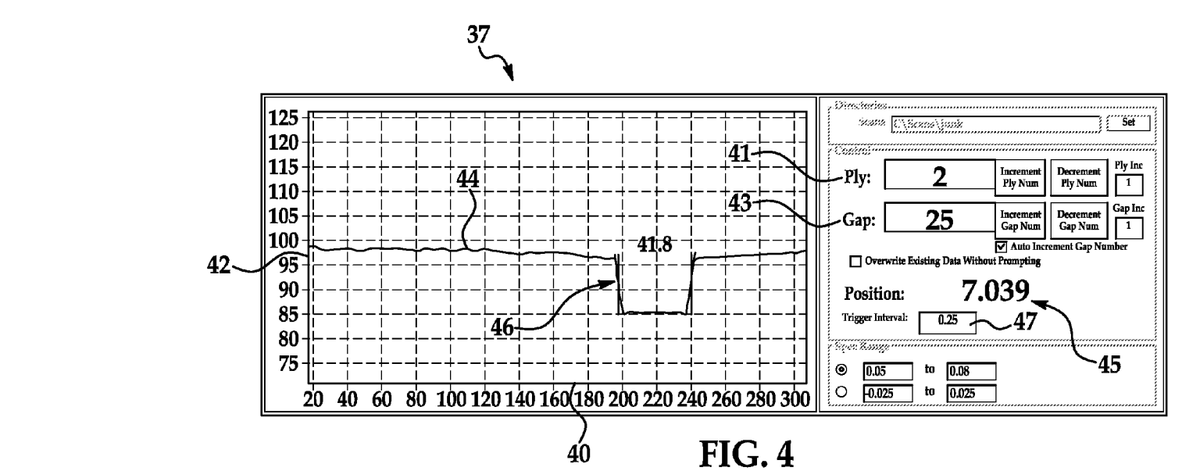
FIG. 4 is an illustration of a computer display screenshot graphically illustrating a tape gap measurement.

FIG. 4 illustrates a display 37 forming part of the controller 36 which may be used by a technician to view tape gap information, either in real time or after gap measurements are made and recorded. The right side of the display 37 shows the ply number 41, gap number 43 and the position 45 along a tape strip 26 where the gap is measured. The trigger interval 47 may also be selected, between the positions 45 where gap measurements are made. The left side of the display 37 shows a graph 44 in which a measured gap is displayed at 46 in two dimensions, corresponding to the 2-D surface profile along the laser lines 38. These two dimensions comprise the depth of the gap shown on the ordinate 42, and its width and lateral position shown on the abscissa 40.

Figure 5:
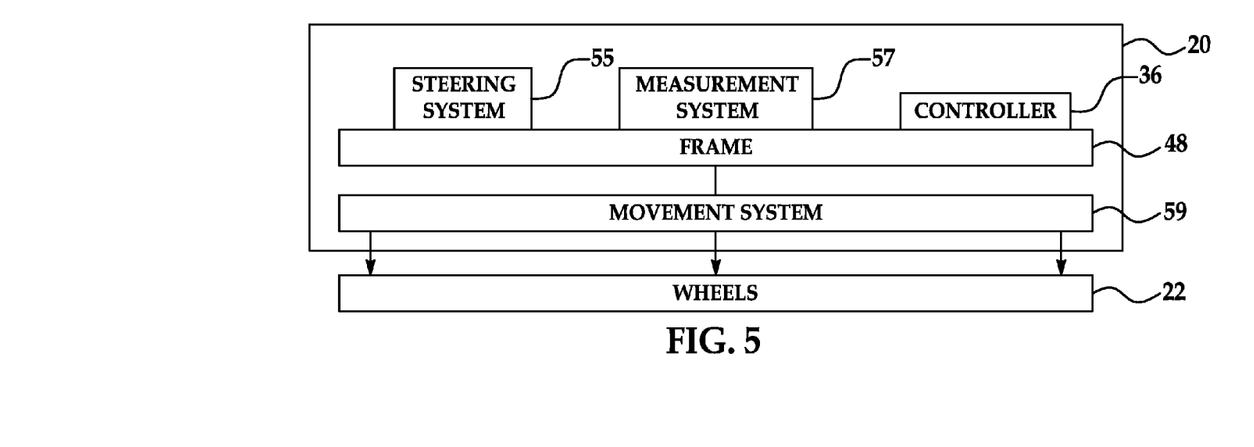
FIG. 5 is a functional block diagram of the portable gauge and related control components.

FIG. 5 is a functional block diagram of the portable gauge 20 at the system level. The gauge 20 includes a frame 48 provided with a movement system 59 that allows the frame 48 to move along the tape strip surface 22. A gap measurement system 57 measures the gap 28 between adjacent tape strips 26 (FIG. 2) at preselected intervals as the frame 48 moves along the surface 22, continuously along the path of the tape strips 26. In other embodiments, the gap 28 may be measured continuously, rather than at intervals of time or distance traveled. A steering system 55 provides active, automatic steering of the gauge as it moves along the tape surface 22.

Figure 6:
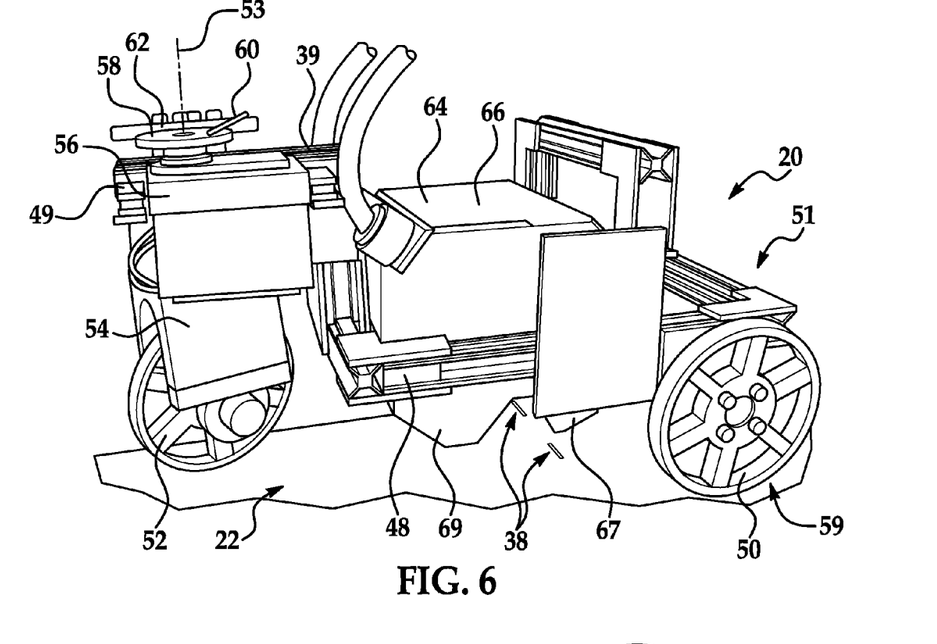
FIG. 6 is an illustration of a perspective view of one embodiment of the portable gauge.
Figure 7:
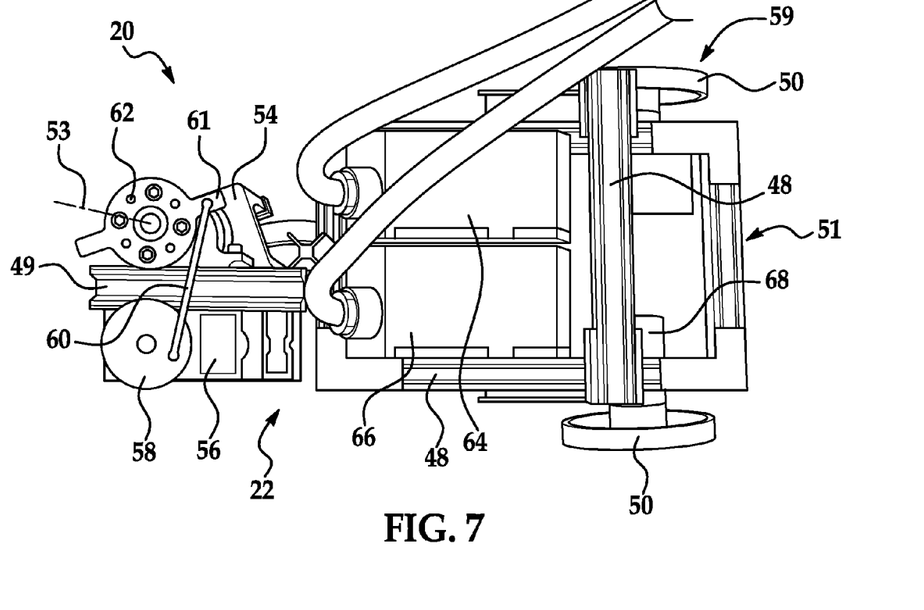
FIG. 7 is an illustration of a plan view of the portable gauge shown in FIG. 6.

Attention is now directed to FIGS. 6 and 7 which illustrate additional details of the portable gauge 20. The gauge 20 includes a generally rectangular frame 48 having a rear extension 39. The movement system 59 comprises a pair of wheels 50 mounted on the forward end 51 of the frame 48, and a trailing, steerable wheel 52. The steerable wheel 52 is mounted on a steering column 62 pivotally mounted on the rear frame extension 39. The steering column 62 is pivotable about an axis 53 that extends generally normal to the tape surface 22. The wheels 50, 52 allow the frame 48 to roll across surface 22 during the tape gap measurement process. More or less than three wheels 50, 52 may be employed to support the frame 48 for movement along the tape surface 22. Also, the movement system 59 may comprise any of various other types of mechanisms and structures that allow the gauge 20 to move along the tape surface 22. For example, and without limitation, the movement system 59 may comprise other forms of members, such as skids, skis or tracks that support the frame 48 on the tape strip surface 22 and allow the gauge to traverse over simple or complex contours on the surface 22.

The steering system 55 (FIG. 5) includes an electrical servo motor 56 mounted on the rear frame extension 39. The servo 56 rotates a disk 58 which is connected by a steering link 60 to a steering arm 61 on the steering column 62. The rotational motion of the disk 58 is transferred via link 60 and arm 61 to rotate the steering column 62 and the rear wheel 52. A pair of 2-D laser line scanners 64, 66, which may comprise commercially available items, are mounted in side-by-side relationship on the frame 48. Each of the laser line scanners 64, 66 includes a laser line projector 67 and a corresponding 2-D non-contact optical sensor 69 which sense the 2-D reflections of the lines 38 on the surface 22. These sensed 2-D reflections are converted into electrical signals by the optical sensors 69 which are used by the controller 36 to calculate the tape gaps.

As shown in FIG. 7, a position sensor in the form of a rotary encoder 68 or similar device is coupled with one of the forward wheels 50 and functions to produce output signals that represent the linear position of the gauge 20 as it moves along the path of the tapes 26. Although not shown in FIG. 6 or 7, an arm 32 and/or handle 34 shown in FIG. 1, may be attached to the frame 48 in order to allow a technician to roll the gauge 20 along the tape surface 22. In other embodiments, it is possible that movement of the gauge 20 may be self-propelled, driven by an on-board motor (not shown)

Figure 8:
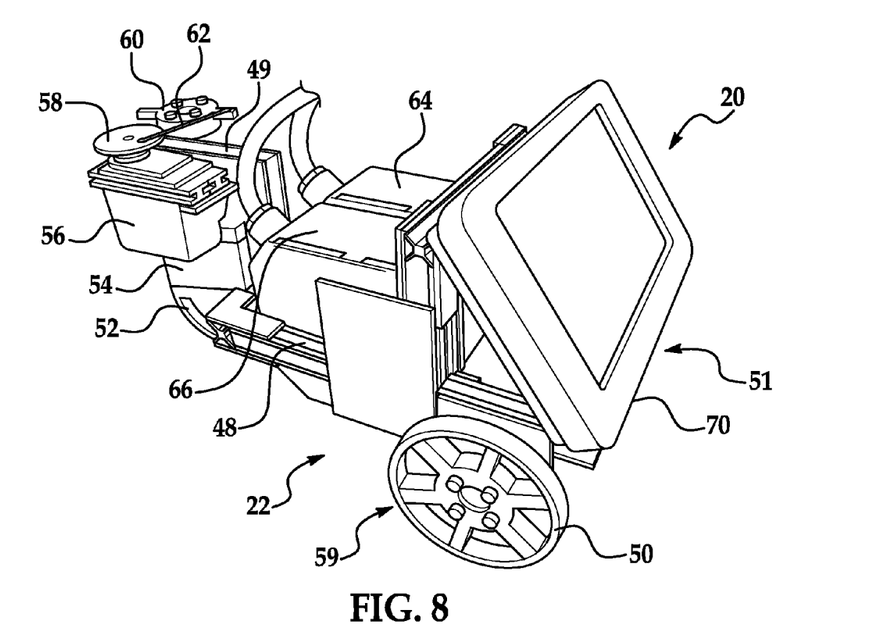
FIG. 8 is an illustration of a perspective view of another embodiment the portable gauge that includes an on-board display screen.

FIG. 8 illustrates an alternate of the embodiment of the portable gauge 20 similar to that shown in FIGS. 6 and 7 except that a local display screen 70 is mounted on the frame 48 which provide the technician with a display, similar to that shown in FIG. 4, of the tape gap 28 being measured, along with the position of the gauge 20.

Figure 9:
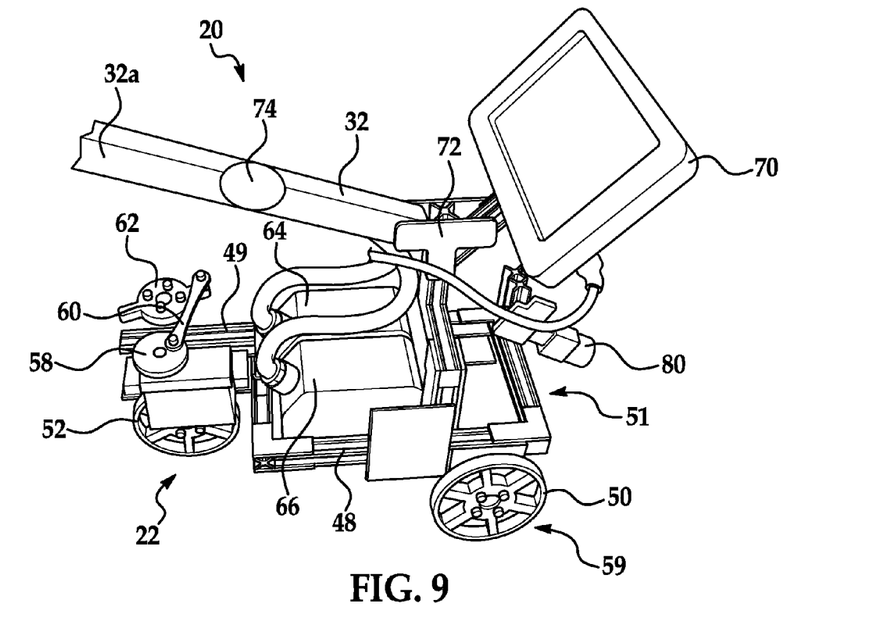
FIG. 9 is an illustration of a perspective view of a further embodiment of the portable gauge.
Figure 10:
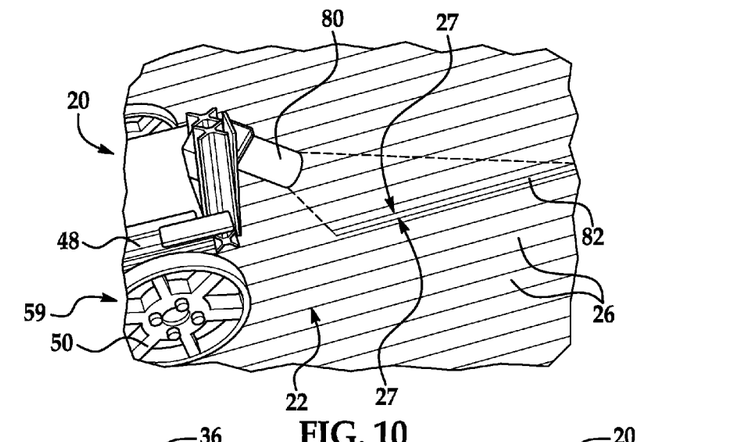
FIG. 10 is an illustration of a perspective view showing how the portable gauge is initially aligned on a tape surface using a projected laser line.

FIG. 9 illustrates another embodiment of the portable gauge 20, similar to that shown in FIGS. 6-8. In this embodiment, the local display screen 70 is mounted on a support bracket 72 attached to the frame 48. A push arm is attached to the support 72 provides the technician with a means of moving the gauge 20 along the tape surface 22. Arm 32 may be coupled by a ball joint 74 to an upper arm portion 78 so that as the technician pushes against the arm 32, minimal lateral force is imparted to the gauge 20 which might affect steering. A laser line generator 80 is mounted on the forward portion 52 of the frame 48 and is oriented to project a line 82 onto the tape surface 22. Line 82 may be used to align the gauge 20 with one of the tape strips 26 as shown in FIG. 10, so that the edges 27 of the tape strips 26 are within the field-of-view of the laser scanners 64, 66 at the outset of a gap measurement cycle.

Figure 11:
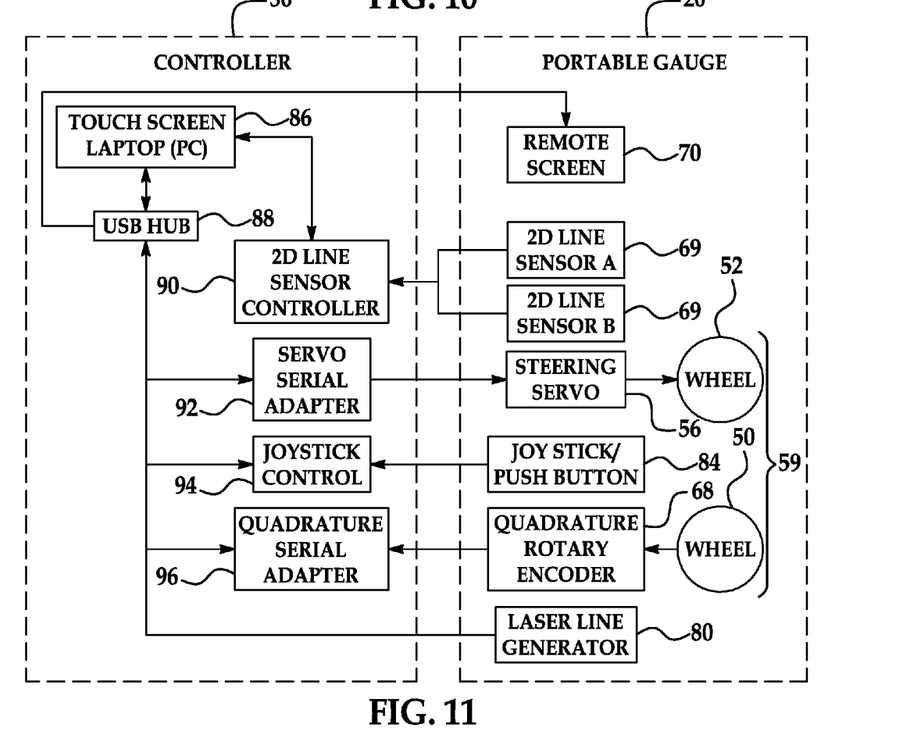
FIG. 11 is an illustration of a block diagram of electrical components of the portable gauge and a remote controller.

Attention is now directed to FIG. 11 which broadly illustrates several of the electronic components of the portable gauge 20 and the controller 36. As previously discussed, the portable gauge 20 includes a steering servo motor 56 that controls the rear wheel 52, a pair of laser line scanners 64, 66 and a rotary encoder 68. The portable gauge 20 may optionally include a joystick and/or an electrical push button 84 that may be used to control steering or initiate a tape gap measurement cycle. Also, as previously discussed, the portable gauge 20 may include an optional on-board display screen 70 and a laser line generator 80. The on-board display screen 70 may display information similar to that which may be displayed on a touch screen laptop computer 86 forming part of the controller 36 discussed below.

The controller 36 broadly includes a computer 86 which may comprise a personal computer in the form of touch screen laptop computer which is connected through a USB hub to the remote display screen 70. The computer 86 generates and sends steering signals through the USB hub 88 and a servo serial adapter 92 to the steering servo motor 56. Signals generated by the joystick and/or push button 84 are sent to the computer 86 through a joystick control 94 and the USB hub 88. The quadrature signals developed by the rotary encoder 68 are delivered through a quadrature serial adapter 96 and the USB hub 88 to the computer 86. The computer 86 can be used to control the laser line generator 80. Signals developed by the optical sensors 69 forming part of the 2-D laser line scanners 64, 66 are delivered to the computer 86 via a 2-D line sensor controller 90. It should be noted here that while the controller 36 is depicted as being separate from the gauge 20 in the disclosed embodiment, one or more components of the controller 36 may be mounted on-board the gauge 20 in other embodiments.

Figure 12:
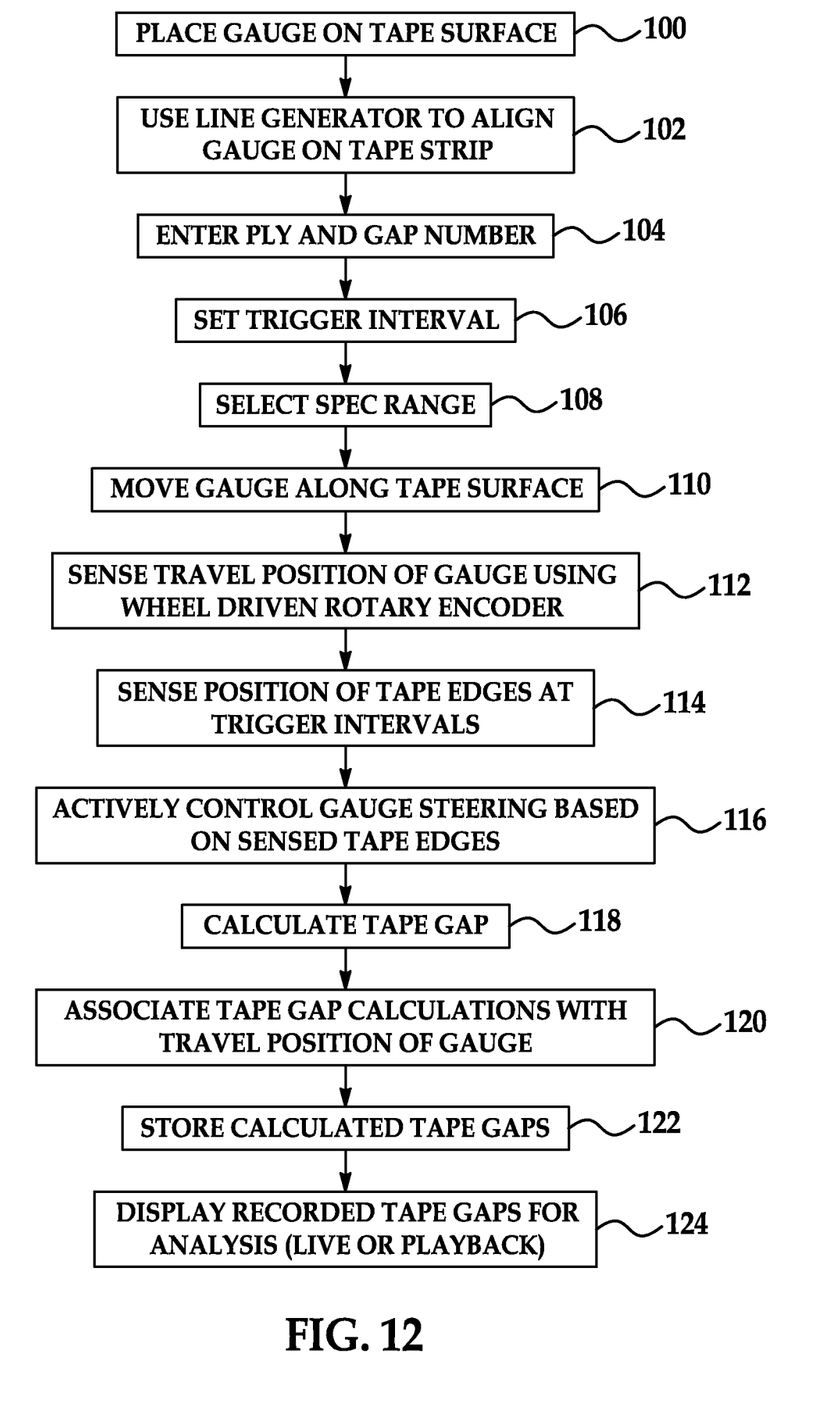
FIG. 12 is an illustration of a flow diagram of a method of measuring tape gaps using the portable gauge.

Attention is now directed to FIG. 12 which illustrates the overall steps of a method of measuring tape gaps 28 using the portable gauge 20 previously described. Beginning at 100, the gauge 20 is placed on the tape surface 22 and at 102 the laser line generator 80 may be used to align the gauge 20 the along tape strips 26. Next, at step 104, the ply number and gap number are entered into the computer 86 using either the remote on-board screen 70 or the touch screen on the computer 86 which forms part of the controller 36. Next, at 106, the interval at which gap measurements are triggered is set and a specification range is selected at 108. The specification range selected at 108 establishes the criteria for classifying either the type or severity of the tape gap being measured. The specification range may correspond to pre-established manufacturing tolerances. At 110, the portable gauge 20 is moved along the tape surface 22 by a technician using the handheld arm 32 (FIG. 9) to push the gauge 20 forwardly, in the direction 30 (FIG. 3) that the tape strips 26 were initially laid down. Alternatively, as previously mentioned, the gauge 20 may be self-propelled.

At 112, the travel position of the gauge 20 is sensed using the wheel driven rotary encoder 68. At 114, the positions of the edges 27 of the tape strips 26 are sensed in the triggered intervals using the laser line scanners 64, 66. At 116, the tape edge information sensed at 114 is used to actively control steering of the gauge 20. At 117, the sensed tape edge information is output as data from the measurement system 57 to the controller 36, and at 118, the sensed tape edge information is used to calculate the tape gap 28. The tape gap calculations are associated with the travel position of the gauge 20 at step 120. The calculated tape gaps are stored at 122 along with associated travel positions of the gauge 20, and are displayed at 124 either in real time or in a playback, review mode.

Figure 13:
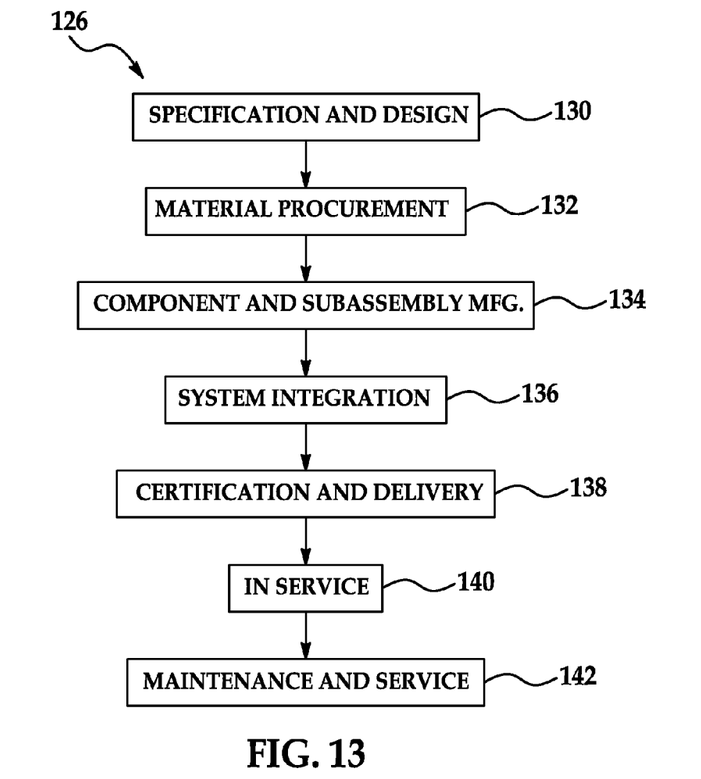
FIG. 13 is an illustration of a flow diagram of aircraft production and service methodology.
Figure 14:
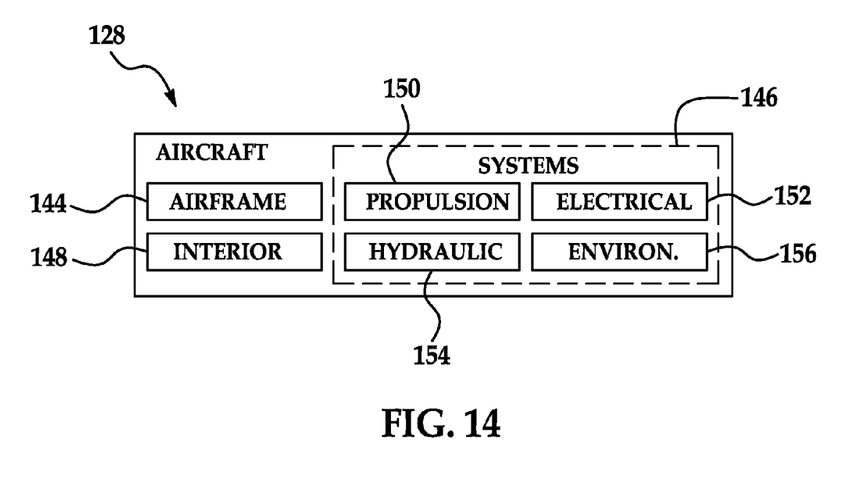
FIG. 14 is an illustration of a block diagram of an aircraft.

Embodiments of the disclosure may find use in a variety of potential applications, particularly in the transportation industry, including for example, aerospace, marine and automotive applications, as well as in other industries where gaps between strips of material need to be measured. Thus, referring now to FIGS. 13 and 14, embodiments of the disclosure may be used in the context of an aircraft manufacturing and service method 126 as shown in FIG. 13 and an aircraft 128 as shown in FIG. 14. Aircraft applications of the disclosed embodiments may include, for example, without limitation, composite members such as fuselage skins, wing skins, control surfaces, hatches, floor panels, door panels, access panels and empennages, to name a few. During pre-production, exemplary method 126 may include specification and design 130 of the aircraft 126 and material procurement 132. During production, component and subassembly manufacturing 134 and system integration 136 of the aircraft 126 takes place. Thereafter, the aircraft 126 may go through certification and delivery 138 in order to be placed in service 140. While in service by a customer, the aircraft 126 is scheduled for routine maintenance and service 142 (which may also include modification, reconfiguration, refurbishment, and so on).

Each of the processes of method 126 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 128 produced by exemplary method 128 may include an airframe 144 with a plurality of systems 146 and an interior 148. Examples of high-level systems 146 include one or more of a propulsion system 150, an electrical system 152, a hydraulic system 154, and an environmental system 156. Any number of other systems may be included. Although an aerospace example is shown, the principles of the disclosure may be applied to other industries, such as the marine and automotive industries.

Systems and methods embodied herein may be employed during any one or more of the stages of the production and service method 126. For example, components or subassemblies corresponding to production process 134 may be fabricated or manufactured in a manner similar to components or subassemblies produced while the aircraft 128 is in service. Also, one or more apparatus embodiments, method embodiments, or a combination thereof may be utilized during the production stages 134 and 136, for example, by substantially expediting assembly of or reducing the cost of an aircraft 128. Similarly, one or more of apparatus embodiments, method embodiments, or a combination thereof may be utilized while the aircraft 128 is in service, for example and without limitation, to maintenance and service 132.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A tape gap inspection gauge, comprising:
    a measurement system for measuring a gap between adjacent tape strips, including a non-contact sensor for sensing an edge of at least one of the tape strips;
    a movement system for moving the measurement system along a surface of the tape strips, the movement system comprising a steering system for steering the movement of the tape gap inspection gauge along the surface of the tape strips, the steering system controlled based on a location of the edge.

2. The tape gap inspection gauge of claim 1, further comprising:
    a frame,
    wherein the measurement system is mounted on the frame.

3. The tape gap inspection gauge of claim 2, wherein:
    the movement system includes wheels supporting the frame for rolling movement along the surface of the tape strips, and
    the steering system includes a servo motor coupled with at least one of the wheels for steering the wheel.

4. The tape gap inspection gauge of claim 3, further comprising:
    a controller for controlling operation of the servo motor based on the location of the edge.

5. The tape gap inspection gauge of claim 1, wherein the measurement system includes two of the non-contact sensors for detecting the edges of at two adjacent tape strips.

6. The tape gap inspection gauge of claim 5, wherein:
    the measurement system includes a pair of laser line projectors for respectively projecting laser lines across edges of adjacent ones of the tape strips, and
    the non-contact sensors are operative for sensing a 2-D profile of the laser lines reflected from the surface of the tape strips.

7. The tape gap inspection gauge of claim 1, further comprising:
    a position sensor for sensing the position of the measurement system as the measurement system moves along the surface of the tape strips.

8. The tape gap inspection gauge of claim 1, further comprising:
    a controller for calculating the gap based on the sensed edge of the tape strip and for controlling the movement system.

9. A portable gauge for inspecting a surface of a composite structure formed from strips of composite tape, comprising:
    a measurement system for measuring a feature of the strips of the tape; and
    a movement system adapted to be placed on the surface of the structure for moving the measurement system along the surface.

10. The portable gauge of claim 9, wherein the feature is a gap between adjacent tape strips and measurement system includes:
    sensors for sensing edges of adjacent ones of the tape strips and
    a computer coupled with the sensors for calculating the gap based on a location of the sensed edges.

11. The portable gauge of claim 10, wherein:
    the measurement system includes a pair of laser line projectors for projecting laser lines across the edges of the adjacent ones of tape strips, and
    the sensors are positioned to sense 2-D reflections of the projected laser lines from the surface of the structure.

12. The portable gauge of claim 9, further comprising:
    a frame having the measurement system mounted thereon, and
    wherein the movement system includes members for supporting the frame on and movement along the surface of the structure.

13. The portable gauge of claim 12, wherein the movement system includes an active steering system for automatically steering the movement of the gauge along the surface of the structure.

14. The portable gauge of claim 9, wherein the measurement system includes a controller for automatically triggering acquiring and analyzing measurements of the feature.

15. The portable gauge of claim 12, further comprising:
    an arm adapted coupled with the frame and adapted to be engaged by an operator for moving the frame along the surface.

16. The portable gauge of claim 9, further comprising:
    an encoder for generating electrical signals related to a position of the measurement system along a length of the tape strips.

17. A method of measuring a gap between strips of composite tape forming a composite structure, comprising:
    placing a gauge on a surface of the structure;
    moving the gauge along the surface of the structure;
    using a measurement system on the gauge to measure gaps between the strips of tape as the gauge is moved along the surface, wherein using the measurement system to measure the gaps comprises sensing a position of edges of adjacent strips of the strips of tape as the gauge is moved along the surface, and wherein moving the gauge along the surface comprises automatically steering the gauge based on the sensed position of the edges of the adjacent strips.

18. The method of claim 17, wherein moving the gauge along the surface of the structure further comprises:
    rolling a frame along the surface, and
    automatically steering movement of the frame.

19. The method of claim 17, wherein using the measurement system to measure the gaps further comprises:
    calculating gaps between the adjacent strips based on the sensed position of the tape strip edges.

20. The method of claim 19, further comprising:
    sensing a position of the gauge as the gauge moves along the surface; and
    correlating calculated gaps with recorded positions of the gauge.

21. The method of claim 20, wherein sensing the position of the gauge is performed by:

using a surface engaging wheel to drive a rotary encoder, and using the rotary encoder to generate signals related to the position of the gauge on the surface.

22. The method of claim 19, wherein sensing the position of the edges includes:

projecting a line of light onto surface and the across the edges of the adjacent strips, and sensing a 2-D reflection of the line of light.

23. A gauge system for automatically measuring gaps between strips of composite tape forming an aircraft structure, comprising:

a portable gauge movable along the tape strips, including— a frame, wheels on the frame for rolling the frame along the tape strips, including a pair of front wheels and a steerable rear wheel pivotally mounted on the frame behind the front wheels, a servo controlled motor on the frame for steering the rear wheel, linkage coupling the front wheel with the servo controlled motor, a pair of laser scanners mounted on the frame, each of the laser scanners including a laser line projector for projecting a laser line across edges of the tape strips, and a 2-D sensor for sensing a 2-D reflection of the projected laser lines, an on-board display mounted on the frame for displaying an image representing a tape gap, laser line generator for projecting a line onto the tape that may be used to initially align the frame with the tape strips, an arm adapted to be engaged by a human for pushing or pulling the gauge along the tape strips, and a laser device for aligning the gauge on the tape strips such that the edges of the tape strips are within a field of view of the 2-D sensors; and a controller coupled with the gauge for delivering steering signals to the servo controlled motor, for calculating the gaps at each of a plurality of locations along the tape strip and for associating calculated tape gaps with positions along the tape strips.

24. A method of measuring gaps between strips of composite tape forming an aircraft structure, comprising:

placing a wheeled gauge on a surface of the structure;

rolling the gauge along the surface of the structure;

using a wheel on the gauge to drive a rotary encoder;

using the rotary encoder to produce signals representing position of the gauge in its movement along the surface;

projecting a pair of laser lines onto the surface and respectively across two edges of a tape strip;

sensing a 2-D reflection of the laser lines using a pair of non-contact sensors on the gauge, including sensing the edges of the tape strips;

using a computer to calculate the gap between the tape strips at each of a plurality of positions on the surface of the structure;

associating calculated gaps with the positions of the gauge represented by the signals produced by the rotary encoder;

generating steering gauge steering signals based on the edges sensed by the non-contact sensors;

using a servo motor to steer one of the wheels on the gauge; and using the steering signals to control the servo motor.

\* \* \* \* \*